(12) United States Patent
Sandoval

(10) Patent No.: US 10,151,486 B2
(45) Date of Patent: Dec. 11, 2018

(54) COOLED GROMMET FOR A COMBUSTOR WALL ASSEMBLY

(71) Applicant: United Technologies Corporation, Farmington, CT (US)

(72) Inventor: Jonathan P. Sandoval, Hebron, CT (US)

(73) Assignee: United Technologies Corporation, Farmington, CT (US)

(*) Notice: Subject to any disclaimer, the term of this patent is extended or adjusted under 35 U.S.C. 154(b) by 197 days.

(21) Appl. No.: 15/108,148

(22) PCT Filed: Dec. 24, 2014

(86) PCT No.: PCT/US2014/072358
§ 371 (c)(1),
(2) Date: Jun. 24, 2016

(87) PCT Pub. No.: WO2015/147938
PCT Pub. Date: Oct. 1, 2015

(65) Prior Publication Data
US 2016/0327271 A1 Nov. 10, 2016

Related U.S. Application Data

(60) Provisional application No. 61/923,469, filed on Jan. 3, 2014.

(51) Int. Cl.
*F23R 3/04* (2006.01)
*F23R 3/00* (2006.01)
(Continued)

(52) U.S. Cl.
CPC ............ *F23R 3/045* (2013.01); *F02C 3/14* (2013.01); *F23R 3/002* (2013.01); *F23R 3/005* (2013.01);
(Continued)

(58) Field of Classification Search
CPC .. F23R 3/06; F23R 3/045; F23R 3/002; F23R 3/04; F23R 3/16; Y10T 16/05
See application file for complete search history.

(56) References Cited

U.S. PATENT DOCUMENTS 4,132,066 A   1/1979  Austin, Jr. et al.
4,805,397 A * 2/1989  Barbier ................... F23R 3/002
                                                   60/759

(Continued)

FOREIGN PATENT DOCUMENTS

GB    2353589 A    2/2001

OTHER PUBLICATIONS

EP search report for EP14887080.1 dated Dec. 1, 2016.

*Primary Examiner* — Gerald L Sung
*Assistant Examiner* — Stephanie Cheng
(74) *Attorney, Agent, or Firm* — O'Shea Getz P.C.

(57) ABSTRACT

A combustor wall assembly has a heat shield and a supporting shell with a cooling cavity defined therebetween. A grommet generally includes a wall defining a dilution hole isolated from the cooling cavity, and a flange projecting radially outward from the wall and into the cooling cavity. The flange is space from the heat shield and a cooling channel is defined between the wall and the heat shield that communicates with the cavity for cooling the wall proximate to a combustion chamber.

14 Claims, 4 Drawing Sheets

(51) Int. Cl.
 *F23R 3/50* (2006.01)
 *F23R 3/06* (2006.01)
 *F02C 3/14* (2006.01)

(52) U.S. Cl.
 CPC ............... *F23R 3/06* (2013.01); *F23R 3/50* (2013.01); *F05D 2220/32* (2013.01); *F23R 2900/03041* (2013.01); *F23R 2900/03043* (2013.01); *Y02T 50/675* (2013.01)

(56) References Cited

U.S. PATENT DOCUMENTS

| | | | |
|---|---|---|---|
| 4,887,432 A * | 12/1989 | Mumford | F23R 3/045 60/759 |
| 5,235,805 A * | 8/1993 | Barbier | F23R 3/26 60/39.23 |
| 2002/0189260 A1 | 12/2002 | David et al. | |
| 2010/0186416 A1 | 7/2010 | Chen et al. | |
| 2012/0297778 A1 | 11/2012 | Rudrapatna et al. | |
| 2013/0025288 A1 | 1/2013 | Cunha et al. | |
| 2013/0031783 A1 * | 2/2013 | DiCintio | F23R 3/06 29/890.02 |
| 2013/0255269 A1 | 10/2013 | McKenzie et al. | |
| 2013/0283800 A1 * | 10/2013 | Romig | F02C 7/22 60/733 |

* cited by examiner

COOLED GROMMET FOR A COMBUSTOR WALL ASSEMBLY

This application claims priority to PCT patent application Ser. No. PCT/US14/072,358 filed Dec. 24, 2014 which claims priority to U.S. Patent Application No. 61/923,469 filed Jan. 3, 2014, which are hereby incorporated herein by reference in their entireties.

BACKGROUND

The present disclosure relates to a gas turbine engine and, more particularly, to a grommet for a combustor wall assembly.

Gas turbine engines, such as those that power modern commercial and military aircraft, include a fan section to propel the aircraft, a compressor section to pressurize a supply of air from the fan section, a combustor section to burn a hydrocarbon fuel in the presence of the pressurized air, and a turbine section to extract energy from the resultant combustion gases and generate thrust.

The combustor section typically includes a wall assembly having an outer shell lined with heat shields that are often referred to as floatwall panels. Together, the panels define a combustion chamber. A plurality of dilution holes are generally spaced circumferentially about the wall assembly and flow dilution air from a cooling plenum and into the combustion chamber to improve emissions, and reduce and control the temperature profile of combustion gases at the combustor outlet to protect the turbine section from overheating.

The dilution holes are generally defined by a grommet that extends between a heat shield panel and supporting shell with a cooling cavity defined therebetween. Enhanced cooling of the grommets is desirable for improved robustness and durability.

SUMMARY

A grommet according to one, non-limiting, embodiment of the present disclosure includes a first wall defining a dilution hole disposed along a centerline, a first flange projecting outward from the first wall and including a first face and an opposite second face, and a plurality of standoffs engaged to the first face.

Additionally to the foregoing embodiment, the first wall includes first and second portions projecting outward from the respective first and second faces, and the plurality of standoffs are spaced radially outward from the first portion.

In the alternative or additionally thereto, in the foregoing embodiment the plurality of standoffs are spaced circumferentially from one-another.

In the alternative or additionally thereto, in the foregoing embodiment the plurality of standoffs project outward from the first face and are an integral and unitary part of the first flange.

In the alternative or additionally thereto, in the foregoing embodiment the plurality of standoffs are brazed to the first face.

In the alternative or additionally thereto, in the foregoing embodiment the grommet includes a second flange spaced radially outward from the first portion and spaced axially from the first face, wherein each one of the plurality of standoffs spans between the first face and the second flange.

In the alternative or additionally thereto, in the foregoing embodiment each one of the plurality of standoffs is engaged to the second flange.

In the alternative or additionally thereto, in the foregoing embodiment the grommet includes a second wall spaced radially outward from and concentric to the first portion and spaced axially from the first face.

In the alternative or additionally thereto, in the foregoing embodiment the first portion and the second wall define an annular cooling channel therebetween.

In the alternative or additionally thereto, in the foregoing embodiment the first portion includes an annular first face, and the second wall includes an annular second face disposed substantially flush with the annular first face.

A combustor wall assembly according to another, non-limiting, embodiment of the present disclosure includes a heat shield, a shell, and a grommet, wherein the heat shield and the shell at least partially define a cooling cavity therebetween, and the grommet defines a dilution hole communicating through the heat shield and the shell isolated from the cooling cavity and a cooling channel in communication with the cooling cavity.

Additionally to the foregoing embodiment, the grommet includes a first wall defining at least in-part the dilution hole and a first flange projecting outward from the first wall and into the cooling cavity.

In the alternative or additionally thereto, in the foregoing embodiment, the heat shield includes a first surface defining a first aperture communicating through the heat shield, and the first wall projects axially from the first flange and into the first aperture and is spaced radially inward from the first surface.

In the alternative or additionally thereto, in the foregoing embodiment, the shell includes a second surface defining a second aperture communicating through the shell and centered to the centerline, and the first wall projects axially from the flange and into the second aperture.

In the alternative or additionally thereto, in the foregoing embodiment the first wall is radially spaced from the second surface.

In the alternative or additionally thereto, in the foregoing embodiment, the first flange includes a first face facing and spaced from the heat shield, and an opposite second face in contact with the shell.

In the alternative or additionally thereto, in the foregoing embodiment, a plurality of standoffs are spaced circumferentially from one-another, span between the first flange and the heat shield, and are spaced radially outward from the first wall.

In the alternative or additionally thereto, in the foregoing embodiment a second flange is spaced radially outward from the first wall and spaced axially from the first flange, and the plurality of standoffs span between the first and the second flanges.

In the alternative or additionally thereto, in the foregoing embodiment, the first flange is in sealing contact with the shell and the second flange is in contact with the heat shield.

In the alternative or additionally thereto, in the foregoing embodiment a second wall projects axially from the second flange and into the first aperture, and the second wall is spaced radially outward from the first wall and spaced axially from the first flange.

In the alternative or additionally thereto, in the foregoing embodiment, the plurality of standoffs are an integral and unitary part of the heat shield and are brazed to the first flange.

The foregoing features and elements may be combined in various combination without exclusivity, unless expressly indicated otherwise. These features and elements as well as the operation thereof will become more apparent in light of the following description and the accompanying drawings. It should be understood, however, the following description and figures are intended to exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
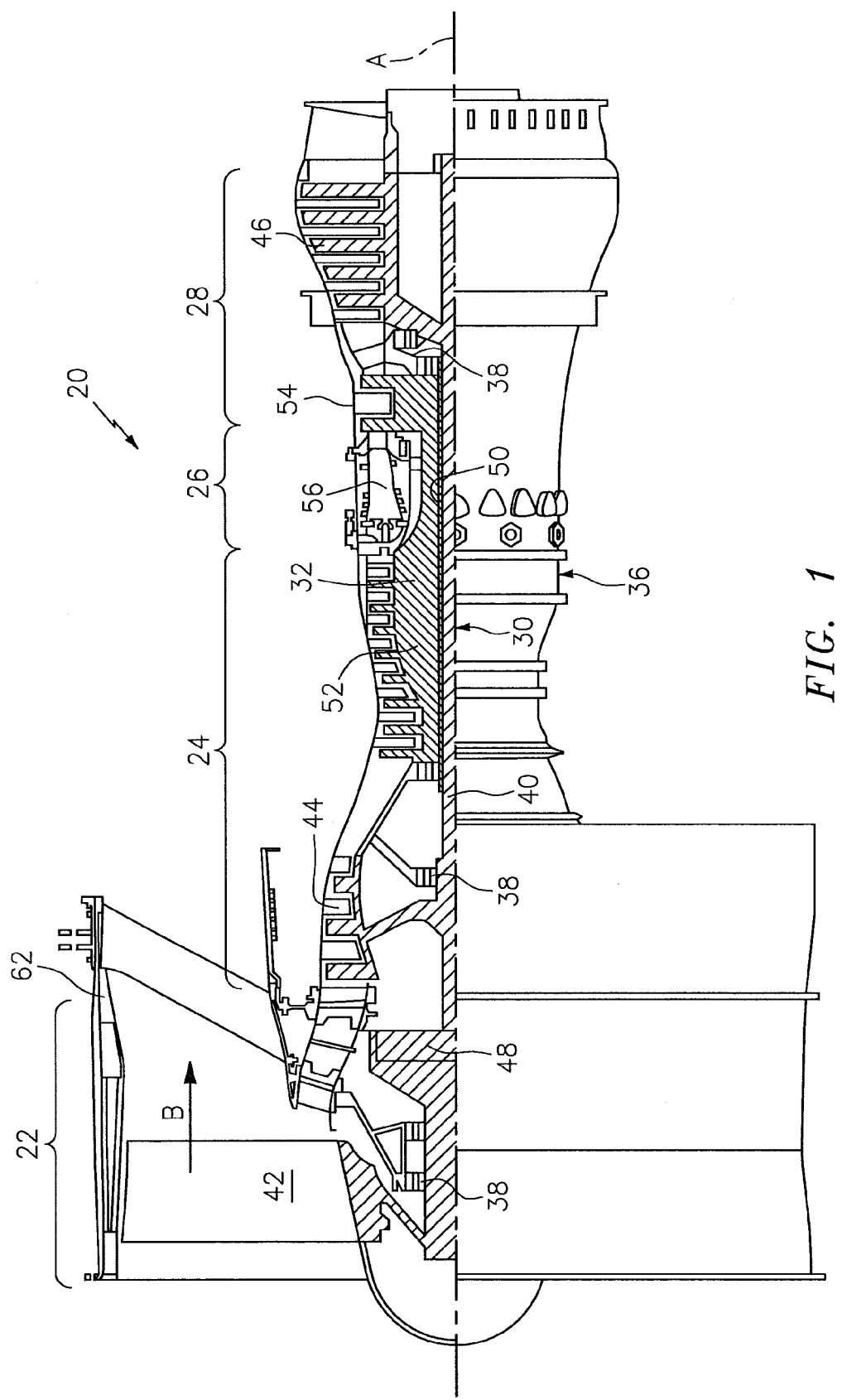
FIG. 1 is a schematic cross-section of a gas turbine engine.

FIG. 1 schematically illustrates a gas turbine engine 20 disclosed as a two-spool turbo fan that generally incorporates a fan section 22, a compressor section 24, a combustor section 26 and a turbine section 28. Alternative engines may include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be understood that the concepts described herein are not limited to use with turbofans as the teachings may be applied to other types of turbine engine architecture such as turbojets, turboshafts, and three-spool turbofans with an intermediate spool.

The engine 20 generally includes a low spool 30 and a high spool 32 mounted for rotation about an engine axis A via several bearing structures 38 and relative to a static engine case 36. The low spool 30 generally includes an inner shaft 40 that interconnects a fan 42 of the fan section 22, a low pressure compressor 44 ("LPC") of the compressor section 24 and a low pressure turbine 46 ("LPT") of the turbine section 28. The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor 52 ("HPC") of the compressor section 24 and a high pressure turbine 54 ("HPT") of the turbine section 28. A combustor 56 of the combustor section 26 is arranged between the HPC 52 and the HPT 54. The inner shaft 40 and the outer shaft 50 are concentric and rotate about the engine axis A. Core airflow is compressed by the LPC 44 then the HPC 52, mixed with the fuel and burned in the combustor 56, then expanded over the HPT 54 and the LPT 46. The LPT 46 and HPT 54 rotationally drive the respective low spool 30 and high spool 32 in response to the expansion.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3:1, and in another example is greater than about 2.5:1. The geared turbofan enables operation of the low spool 30 at higher speeds that can increase the operational efficiency of the LPC 44 and LPT 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting example, the bypass ratio of the gas turbine engine 20 is greater than about ten (10:1); the fan diameter is significantly larger than the LPC 44; and the LPT 46 has a pressure ratio that is greater than about five (5:1). It should be understood; however, that the above parameters are only exemplary of one example of a geared architecture engine and that the present disclosure is applicable to other gas turbine engines including direct drive turbofans.

In one non-limiting example, a significant amount of thrust is provided by the bypass flow path B due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel consumption (TSFC). TSFC is an industry standard parameter of fuel consumption per unit of thrust.

Fan Pressure Ratio is the pressure ratio across a blade of the fan section 22 without the use of a fan exit guide vane system. The low Fan Pressure Ratio according to one non-limiting example of the gas turbine engine 20 is less than 1.45:1. Low Corrected Fan Tip Speed is the actual fan tip speed divided by an industry standard temperature correction of $(T/518.7^{0.5})$, where "T" represents the ambient temperature in degrees Rankine. The Low Corrected Fan Tip Speed according to one non-limiting example of the gas turbine engine 20 is less than about 1150 fps (351 m/s).

Figure 2:
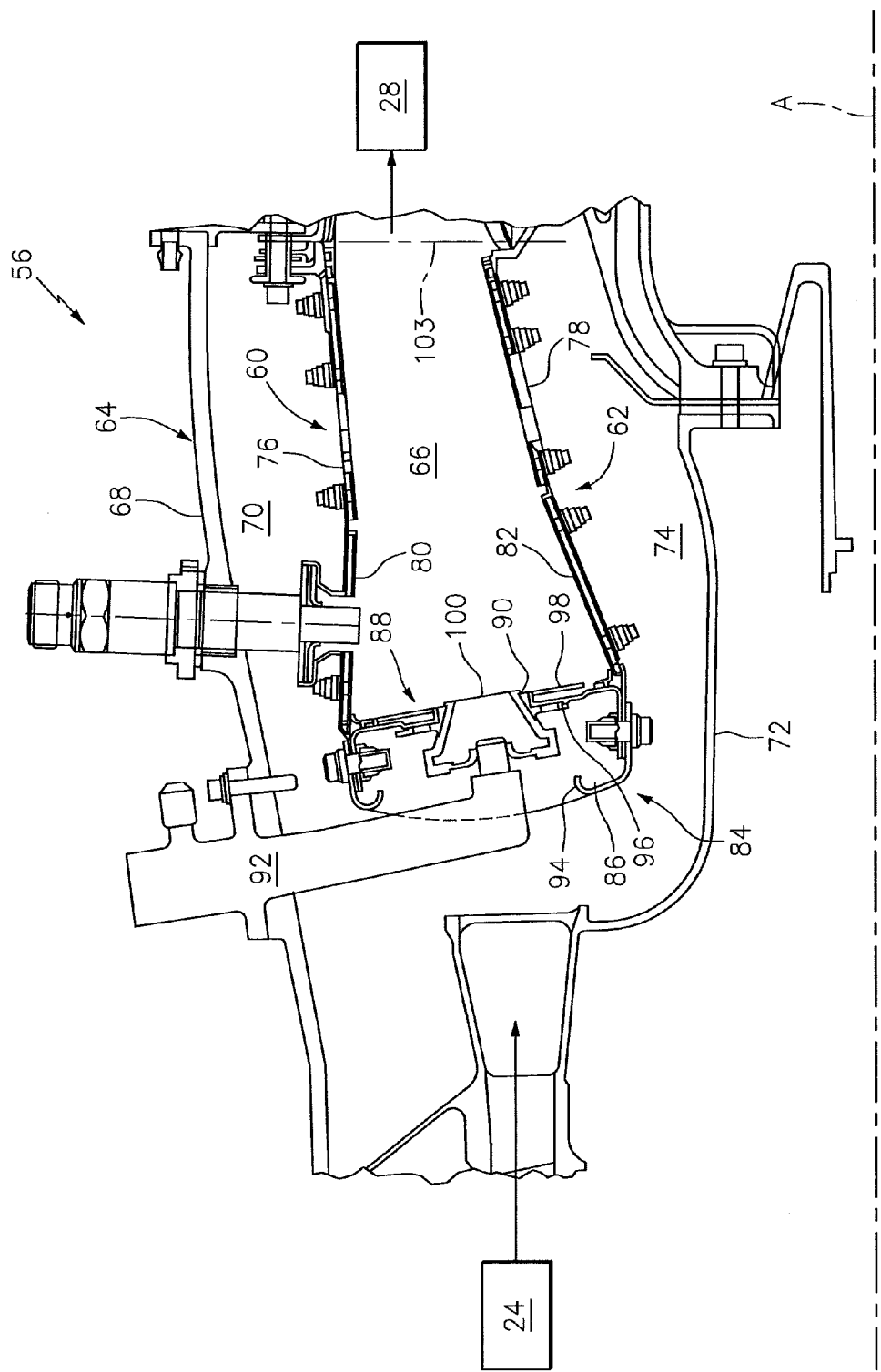
FIG. 2 is a cross-section of a combustor section.

Referring to FIG. 2, the combustor section 26 generally includes an annular combustor 56 with an outer combustor wall assembly 60, an inner combustor wall assembly 62, and a diffuser case module 64 that surrounds assemblies 60, 62. The outer and inner combustor wall assemblies 60, 62 are generally cylindrical and radially spaced apart such that an annular combustion chamber 66 is defined therebetween. The outer combustor wall assembly 60 is spaced radially inward from an outer diffuser case 68 of the diffuser case module 64 to define an outer annular plenum 70. The inner wall assembly 62 is spaced radially outward from an inner diffuser case 72 of the diffuser case module 64 to define, in-part, an inner annular plenum 74. Although a particular combustor is illustrated, it should be understood that other combustor types with various combustor liner arrangements will also benefit. It is further understood that the disclosed cooling flow paths are but an illustrated embodiment and should not be so limited.

The combustion chamber 66 contains the combustion products that flow axially toward the turbine section 28. Each combustor wall assembly 60, 62 generally includes a respective support shell 76, 78 that supports one or more heat shields or liners 80, 82. Each of the liners 80, 82 may be formed of a plurality of floating panels that are generally rectilinear and manufactured of, for example, a nickel based super alloy that may be coated with a ceramic or other temperature resistant material, and are arranged to form a liner configuration mounted to the respective shells 76, 78.

The combustor 56 further includes a forward assembly 84 that receives compressed airflow from the compressor section 24 located immediately upstream. The forward assembly 84 generally includes an annular hood 86, a bulkhead assembly 88, and a plurality of swirlers 90 (one shown). Each of the swirlers 90 are circumferentially aligned with one of a plurality of fuel nozzles 92 (one shown) and a respective hood port 94 to project through the bulkhead assembly 88. The bulkhead assembly 88 includes a bulkhead support shell 96 secured to the combustor wall assemblies 60, 62 and a plurality of circumferentially distributed bulkhead heat shields or panels 98 secured to the bulkhead support shell 96 around each respective swirler 90 opening. The bulkhead support shell 96 is generally annular and the plurality of circumferentially distributed bulkhead panels 98 are segmented, typically one to each fuel nozzle 92 and swirler 90.

The annular hood 86 extends radially between, and is secured to, the forwardmost ends of the combustor wall assemblies 60, 62. Each one of the plurality of circumferentially distributed hood ports 94 receives a respective one of the plurality of fuel nozzles 92, and facilitates the direction of compressed air into the forward end of the combustion chamber 66 through a swirler opening 100. Each fuel nozzle 92 may be secured to the diffuser case module 64 and projects through one of the hood ports 94 into the respective swirler 90.

The forward assembly 84 introduces core combustion air into the forward section of the combustion chamber 66 while the remainder of compressor air enters the outer annular plenum 70 and the inner annular plenum 74. The plurality of fuel nozzles 92 and adjacent structure generate a blended fuel-air mixture that supports stable combustion in the combustion chamber 66.

Figure 3:
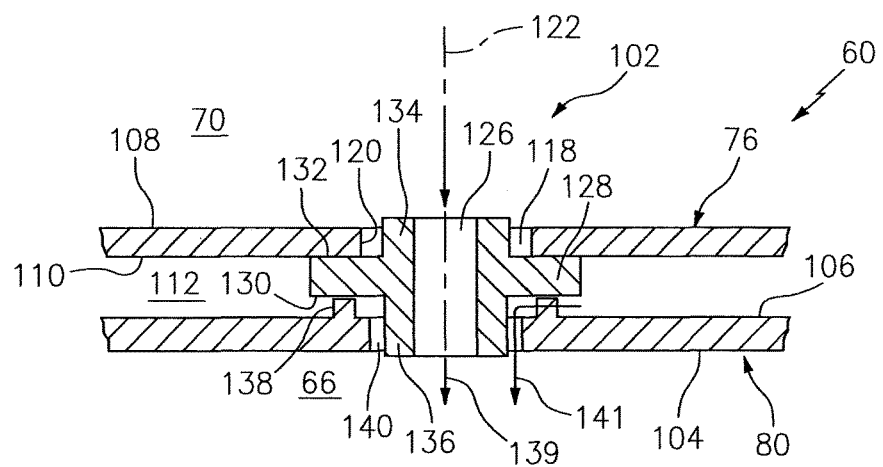
FIG. 3 is a partial cross section of a combustor wall assembly having a grommet according to one non-limiting example of the disclosure.
Figure 4:
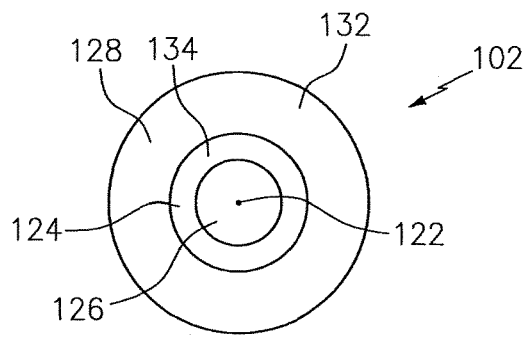
FIG. 4 is a top plan view of the grommet.
Figure 5:
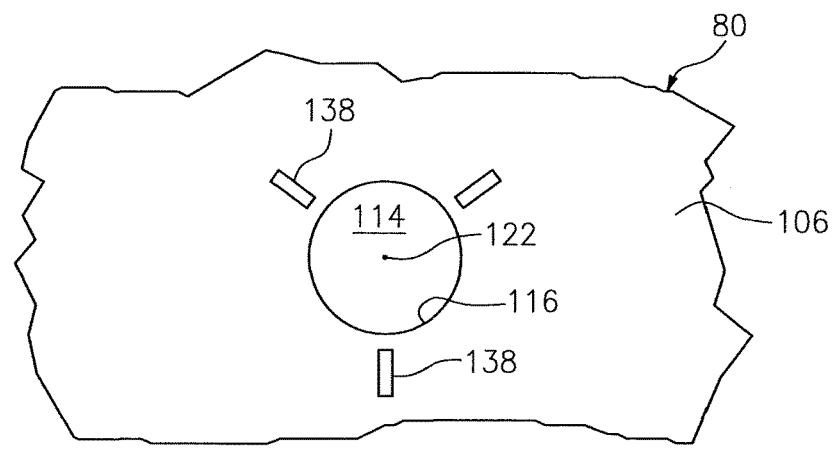
FIG. 5 is a plan view of a cold side of a heat shield of the wall assembly.

Referring to FIGS. 3 through 5, a grommet 102 is illustrated and further described in relation to the outer wall assembly 60 for simplicity of explanation; however, it is understood that the same grommet may be applied to the inner wall assembly 62 of the combustor 56. The heat shield 80 of wall assembly 60, which may include an array of panels, carries a hot side 104 that generally defines in-part a boundary of the combustion chamber 66 and an opposite cold side 106. The shell 76 carries an outer side 108 that faces and defines in-part a boundary of the cooling plenum 70 and an opposite inner side 110 that faces the cold side 106 of the heat shield 80. An annular cooling cavity 112 is located between and defined by the cold side 106 of the heat shield 80 and the inner side 110 of the shell 76.

An aperture 114 communicates through the heat shield 80 and is defined by a continuous surface 116 carried by the heat shield 80 and spanning between the hot and cold sides 104, 106. Similarly, an aperture 118 communicates through the shell 76 and is defined by a continuous surface 120 carried by the shell 76 and spanning between the outer and inner sides 108, 110. A centerline 122 extends through the apertures 114, 118 and may be substantially normal to the wall assembly 60 and may intersect the engine axis A.

The grommet 102 has a continuous or cylindrical wall 124 that defines a dilution hole 126, and a flange 128 that projects radially outward (with respect to the centerline 122) from the wall 124 and into the cooling cavity 112. The flange 128 carries inner and outer faces 130, 132 such that an outer portion 134 of the wall 124 generally projects axially outward from the outer face 130 (with respect to centerline 122) and through the aperture 118 of the shell 76, and an inner portion 136 of the wall 124 generally projects axially inward from the inner face 130 and into the aperture 114 in the heat shield 80.

When assembled, the inner face 130 of the flange 128 may be spaced from the cold side 106 of the heat shield 80 by a plurality of standoffs 138 of the grommet 102 (three illustrated as an example). The standoffs 138 are circumferentially spaced from one another about the aperture 114 of the heat shield 80 and span between the inner face 130 of the flange 128 and the cold side 106 of the heat shield 80. Each standoff 138 may be an integral and unitary part of the heat shield 80 with distal ends being brazed or otherwise secured to the inner face 130 of the flange 128. The inner portion 136 of the wall 124 in the aperture 114 is spaced from the surface 116 of the heat shield 80, such that a cooling channel 140, which may be annular in flow cross section, is defined between the surface 116 and inner portion 136.

It is further understood and contemplated that the standoffs 138 may alternatively, or in combination, project from the inner face 130 of the flange 128 and may be brazed to the cold side 106 of heat shield 80. It is further understood that the heat shield 80 and grommet 102 may be formed as one unitary part through any number of manufacturing processes such as processes utilizing leach-out cores, ceramic or Refractory Metal Core (RMC), or additive manufacturing.

The outer face 132 of the flange 128 may be in sealable and releasable contact with the inner side 110 of the shell 76 and the outer portion 134 of the wall 124 may be spaced radially from the surface 118 of the shell 76 to allow for thermal expansion during operation. The seal between the shell 76 and flange 128 helps to maintain the cooling integrity and pressure differentials across the shell and heat shield 80. Although not illustrated, the cooling cavity 112 receives cooling air from the cooling plenum 70 and through a number of impingement holes in the shell. From the cooling cavity 112, cooling air then flows through a plurality of strategically placed effusion holes in the heat shield 80 with a combined flow that forms a cooling blanket across the hot side 104 of the heat shield for thermal protection.

It is further contemplated and understood that while the grommet 102 may be brazed to the wall assembly 60, it may instead be a separate part that is held in place and indexed between the shell 76 and heat shield 80. Such an arrangement may simplify maintenance and enable grommets made of differing or more expensive material that better resist oxidation than, for example, the heat shield 80. In such an arrangement, the sealing contact between the flange 128 and the shell 76 and the contact between the standoffs 138 and the flange 128 act to index and hold the grommet axially with respect to the wall assembly 60. Radial indexing, required to maintain radial clearances for the annular cooling channel 140, can be accomplished by including recesses in the inner face 130 of flange 128 that respectively receive the standoffs 138. It is further understood and contemplated that other indexing means may be applied than that illustrated or described.

In operation, dilution air flows from the plenum 70, through the dilution hole 126 and into the combustion chamber 66 as signified by arrow 139. Cooling air flows from the cooling cavity 112, between the flange 128 and cold side 106 of heat shield 80 (thus about the standoffs 138), then through the annular cooling channel 140 and into the combustion chamber 66 as signified by arrow 141. The cooling air baths and cools the inner portion 136 of the wall 124 most exposed to the hot gases in the combustion chamber 66 and the dilution air enters the combustion chamber in a much higher volume and generally as a jet stream to cool the combustion gases in a core region of the chamber.

Figure 6:
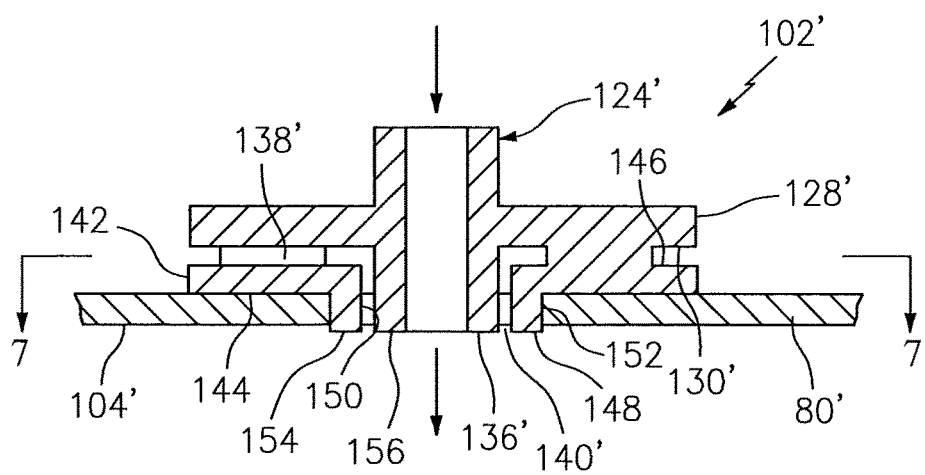
FIG. 6 is a cross section of a second non-limiting example of a wall assembly having a grommet.
Figure 7:
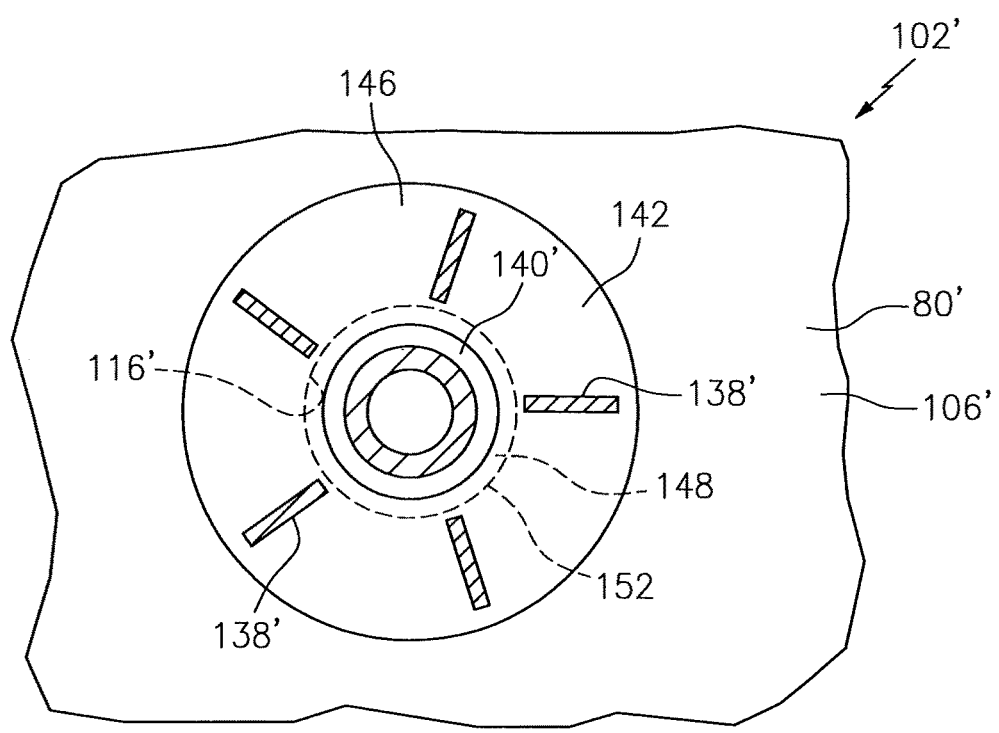
FIG. 7 is a cross section of the wall assembly taken along line 7-7 of FIG. 6.

Referring to FIGS. 6-7, a second example of a grommet is illustrated wherein like components to the first example have like identifying element numbers except with the addition of a prime symbol. The grommet 102' further has a second flange 142 that carries an annular inner face 144 and an opposite annular outer face 146. The outer face 146 of the second flange 142 is axially spaced from an inner face 130' of a first flange 128' by a plurality of standoffs 138'. The grommet 102' may be cast as one piece such that the standoffs 128' are formed to the opposing faces 146, 130'. The inner face 144 of the second flange 142 may be brazed to the cold side 106' of a heat shield 80'.

The grommet 102' further has an outer wall 148 that may be substantially cylindrical and projects axially from an inner periphery of the second flange 142 and into an aperture 114' in the heat shield 80'. The outer wall 148 carries a radial inner surface 150 and an opposite radial outer surface 152. An annular cooling channel 140' is defined between a wall portion 136' of an inner wall 124' and the inner surface 150 of the outer wall 148. The outer surface 152 of the outer wall 148 opposes and may be in contact with a continuous surface 116' of the heat shield 80' that defines the aperture 114'. Both the outer wall 148 and the wall portion 136' of the inner wall 124' have respective annular faces 154, 156 at distal ends that may be substantially flush with one-another, and may be substantially flush with a hot side 104' of the heat shield 80'.

It is understood that relative positional terms such as "forward," "aft," "upper," "lower," "above," "below," and the like are with reference to the normal operational attitude and should not be considered otherwise limiting. It is also understood that like reference numerals identify corresponding or similar elements throughout the several drawings. It should be understood that although a particular component arrangement is disclosed in the illustrated embodiment, other arrangements will also benefit. Although particular step sequences may be shown, described, and claimed, it is understood that steps may be performed in any order, separated or combined unless otherwise indicated and will still benefit from the present disclosure.

The foregoing description is exemplary rather than defined by the limitations described. Various non-limiting embodiments are disclosed; however, one of ordinary skill in the art would recognize that various modifications and variations in light of the above teachings will fall within the scope of the appended claims. It is therefore understood that within the scope of the appended claims, the disclosure may be practiced other than as specifically described. For this reason, the appended claims should be studied to determine true scope and content.

What is claimed is:

1. A grommet for a combustor of a gas turbine comprising:
   a first wall defining a dilution hole of the combustor disposed along a centerline;
   a first flange projecting outward from the first wall and including a first face and an opposite second face;
   and a plurality of standoffs extending from the first face;
   wherein the first wall includes first and second portions projecting outward from the respective first and second faces,
   wherein a second flange spaced radially outward from the first portion and spaced axially from the first face forms a cooling channel therebetween,
   and wherein each one of the plurality of standoffs spans between the first face and the second flange.

2. The grommet set forth in claim 1, wherein the plurality of standoffs are spaced radially outward from the first portion.

3. The grommet set forth in claim 2, wherein the plurality of standoffs are spaced circumferentially from one-another.

4. The grommet set forth in claim 3, wherein the plurality of standoffs project outward from the first face and are an integral and unitary part of the first flange.

5. The grommet set forth in claim 1, wherein each one of the plurality of standoffs is engaged to the second flange.

6. The grommet set forth in claim 5, further comprising:
   a second wall spaced radially outward from and concentric to the first portion and spaced axially from the first face.

7. The grommet set forth in claim 6, wherein the first portion and the second wall define the cooling channel therebetween, and the cooling channel comprises an annular cooling channel.

8. The grommet set forth in claim 6, wherein the first portion includes an annular first face, and the second wall includes an annular second face disposed substantially flush with the annular first face.

9. A combustor wall assembly, comprising:
   a heat shield;
   a shell;
   and a grommet;
   wherein the heat shield and the shell at least partially define a cooling cavity therebetween;
   and wherein the grommet defines:
   a first wall defining at least in-part a dilution hole about a centerline that communicates through the heat shield and the shell, and is isolated from the cooling cavity;
   a first flange projecting radially outward from the first wall and into the cooling cavity;
   a second flange spaced radially outward from the first wall and spaced axially from the first flange to define a cooling channel in communication with the cooling cavity;
   and a plurality of standoffs that span between the first flange and the second flange.

10. The combustor wall assembly set forth in claim 9, wherein the heat shield includes a first surface defining a first aperture communicating through the heat shield, and the first wall projects axially from the first flange and into the first aperture and is spaced radially inward from the first surface.

11. The combustor wall assembly set forth in claim 10, wherein the shell includes a second surface defining a second aperture communicating through the shell and centered to the centerline, and the first wall projects axially from the first flange and into the second aperture.

12. The combustor wall assembly set forth in claim 11, wherein the first wall is radially spaced from the second surface.

13. The combustor wall assembly set forth in claim 9, wherein the first flange is in sealing contact with the shell and the second flange is in contact with the heat shield.

14. The combustor wall assembly set forth in claim 9, further comprising: a second wall projecting axially from the second flange and into the first aperture; and wherein the second wall is spaced radially outward from the first wall and spaced axially from the first flange.

* * * * *